July 31, 1923.
R. C. WAGNER
LOCK FOR TIRE CHAINS
Filed Feb. 20, 1922
1,463,604
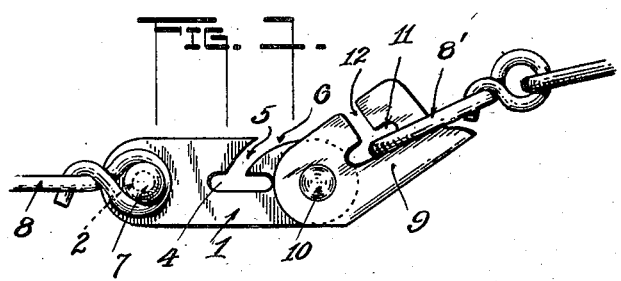
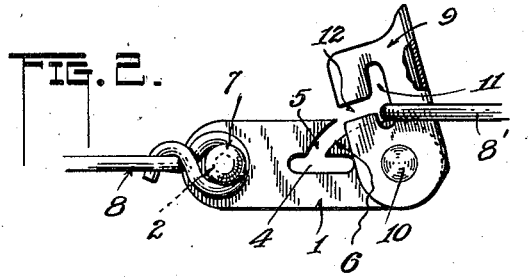
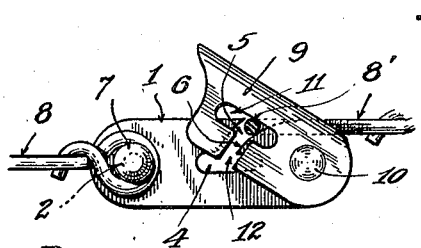
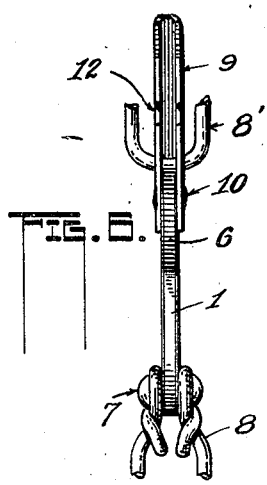
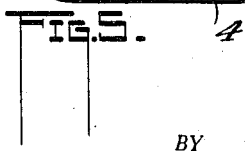
INVENTOR.
R.C. WAGNER,
BY
ATTORNEY.

Patented July 31, 1923.

1,463,604

UNITED STATES PATENT OFFICE.

RAY C. WAGNER, OF METAMORA, ILLINOIS.

LOCK FOR TIRE CHAINS.

Application filed February 20, 1922. Serial No. 538,082.

*To all whom it may concern:*

Be it known that I, RAY C. WAGNER, a citizen of the United States, residing at Metamora, in the county of Woodford and State of Illinois, have invented new and useful Improvements in Locks for Tire Chains; and I do hereby declare that the following is a full, clear, and exact description of the invention, which will enable others skilled in the art to which it appertains to make and use the same.

This invention relates to improvements in locking devices for automobile tire chains.

One of the objects of my invention is to provide a locking device that will be thoroughly rigid and staunch, yet of very simple construction, and one that cannot easily open in use on the road.

Another object is that of providing a locking device of two parts connected pivotally at one end, one end of the tire chain being permanently attached to the other end of one of them, the parts being so constructed and arranged that there can be no tendency of the other end held therebetween to cause the said parts to be moved relatively while in use on the road.

Still another object is that of constructing a device of this nature in such manner that a tire chain while being applied may have considerable looseness for easy handling, which looseness will be mainly taken up as the said device is closed for use.

In the appended drawing forming part of this application,

Figure 1 is a side elevation of my invention showing the parts thereof ready to be closed.

Figure 2 shows the same in a different position.

Figure 3 is a view similar to Figures 1 and 2 showing the parts in still another position.

Figure 4 also a side elevation of the device showing the parts thereof in their positions for use.

Figure 5 is a side elevation of one of the parts of the device shown separately, and Figure 6 shows the edge of the device in its open position.

The numeral 1 indicates a flat strip of metal preferably having rounded ends, and having a hole 2, 3 in opposite ends, Figure 5. Substantially at its middle the strip is provided with a slot 4 extending longitudinally thereof.

Communicating with the same at substantially the middle of its length is a slot 5 extending in a lateral direction at an angle toward or through one edge of the strip, the whole creating a substantially T-shaped recess.

It is particularly to be noted that the slot 5 is described in a curve thereby forming at one end of the strip at its edge a cam surface 6, this surface being gradually rounded from the rounded end having the hole 3 to and terminating at the said slot 4.

A rivet 7 serves to attach one end of the tire chain 8 to the other end of the strip, said rivet passing through the hole 2.

9 is a clasp or sheath made by doubling a strip of metal upon itself but having its sides spaced to receive between them the said strip 1, this being clearly shown in Figure 6.

Said sheath is secured upon the end of the strip, with the latter between its spaced portions, being held by a rivet 10 allowing the parts to pivot upon one another.

Each of the spaced portions of the sheath has a slot 11 extending in a longitudinal direction, its position registering with that of the slot 4 of the strip 1, see Figure 4, when the parts are closed as shown in said figure. A laterally extending slot 12 is connected with the slot 11 at about the middle of its length and extends to and through the edges of the said portions.

It is noted that when assembled as shown in said Figure 4 the open edge of the sheath receives that edge of the strip 1 having the angularly disposed slot 5 and that therefore the slot 12 of the former overlies that portion of the strip opposite that having said slot 5.

In making use of the device, a link of the free end 8' of the chain 8 is hooked within the slot 11 of the opened sheath, Figure 1, which while the said sheath is in the act of closing, Figure 2, drops upon the curved surface, or cam, 6. Now as said sheath is still further closed the link of said free end is carried toward the rivet 7 drawing the chain around the wheel to the proper tension. The particular link employed, of course, determines such proper tension. There is considerable slack in the chain for easy manipulation so that the operator is not required to work under the usual difficulty of first drawing said chain fairly tight around the wheel before he can hook it in place. As used in my arrangement taking up the slack is automatically done in closing the clasp or sheath, such slack being of advantage especially when the chain is being placed on the wheel while out upon the road where adhering mud or ice may have increased the circumference of the wheel.

Now, as the cam surface 6 gradually increases in distance from the rivet 10 toward the point thereof at the slot 4, as arranged a considerable length of chain is taken up.

The link upon reaching the said slot 4 drops back within the same toward the said rivet 10 and prevents the movement of the parts 1 and 9 relatively.

Preferably, the distance between that end of the device having the rivet 10 and the slot 4, 11 is such that the link at 8' cannot reach so far as to come opposite the slot 12, it being necessary to swing the link at an angle to the longitudinal line of said device before it can be in position to pull through the slot 5 to carry the sheath with it. Therefore, while on the road there can be little chance for such action said link being held down in the end of the said slots 4, 11 preventing the sheath 9 being opened to liberate the chain.

With my device the chains can be much more readily applied to a wheel without inspection, as, for instance, when necessity requires their attachment at night on the road, since with the sheath open the link can be hooked thereto in the manner described, whereupon it will be directed to and deposited within the slots 5 and 4, the link, in effect, locking the parts together without further attention or with any anxiety as to the chains being secure against chance loss.

I believe to be new the employment of a pivotally related sheath or enclosing member 9 and the part 1 the latter being frictionally engaged at both sides, where such a sheath has a slot such as 11 corresponding in position with such as the slot 4, the two being held in permanent closed relation by a chain link as described.

I claim:

1. A tire-chain lock comprising two members pivotally connected at one of their ends, one adapted to overlie the other and one of them adapted for attachment at its other end to the tire chain, there being a main slot in each member adapted to be brought into register and lying between the pivot of the members and the place of attachment to the said chain when the members are closed upon one another, there being a second slot in each member extending in a lateral direction from and communicating with the middle of said main slot and each opening through one edge of its respective member but in opposite directions, and one of them lying at an acute angle to the said main slot with which it communicates and extending in the general direction of the pivoted end of the members.

2. A tire-chain lock comprising two members pivotally related at one of their ends, one of them at its free end adapted for attachment to the chain, each said member having a substantially T-shaped slot therein substantially in register when the members overlie one another, the portion of the slot forming the head of the T lying lengthwise between the place of attachment of the chain and pivot for the members, those portions of said slots forming the stem of the T extending to and opening through the edge of the member but at opposite edges of the same, the last named slot of the member having attachment to said chain lying at an acute angle to the said head of the T, the edge of the member therein nearest the pivot of the members being eccentric to said pivot.

3. A tire-chain lock comprising a member adapted for attachment at one end to the chain, a sheath-like second member pivoted to the other end, there being a slot in the first member lying lengthwise thereof, there being a second slot communicating therewith at substantially the middle of its length, an opening through the edge of the member, said second slot lying at an acute angle to the first, that edge of the member within said slot lying nearest the pivot of the members being eccentric to said pivot, the said sheath-like second member having a slot substantially identical with the first named slot and lying parallel thereto when the said member is closed upon the first member and having a communicating slot extending laterally therefrom and opening through the edge of the member opposite that edge of the first member which has the angled slot, the said communicating slots being closed when the members are closed upon one another.

4. In combination with a tire chain, a tire-chain lock comprising a pair of members pivotally connected at one of their ends, one of the members having the form of a sheath to enclose the other member, the latter having attachment to said chain, a slot in each member lying between the point of attachment of the chain and the point of pivotal connection of said members, each member having a laterally extending slot communicating with the middle of the first and extending to and through opposite edges of the respective members, the first described slot of each member extending in each direction from the mouth of the said laterally extending slot, the said laterally extending slot of the member that has attachment to the chain being disposed at an acute angle to the longitudinal line thereof, the edge of said member at said slot nearest the point of pivotal attachment of the two members being a curved surface eccentric to said point of attachment.

5. In a device of the nature described the combination of a member to be interposed between and for connecting the ends of a chain, the same having a slot therein extending longitudinally thereof in line with the chain-ends, and having a laterally extending slot communicating with the first said slot at substantially the middle of the length thereof and opening through one edge of the member, a second member pivoted to one end of the first member, the pivot being in line with said slot, said second member having a T-shaped slot therein, one portion of which is adapted to register with the said first slot, the other portion extending through one edge of the member, the last named slot portion and the communicating slot of the said first member being at opposite edges of the respective members and closed by the member when the latter are closed upon one another, the said communicating slot of said first member being arranged eccentrically to the pivot of the members and adapted to guide the chain link through it into the said first slot.

In testimony whereof I affix my signature in presence of two witnesses.

RAY C. WAGNER.

Witnesses:
J. H. KINGSBURY,
L. M. THURLOW.